INVENTOR.
LYLE K. V. SUDROW

March 31, 1964     L. K. V. SUDROW     3,126,967
AUTOMATIC AUTO-ROTATING MEANS FOR AIRCRAFT SUSTAINING ROTOR
Filed Jan. 15, 1962     3 Sheets-Sheet 2

INVENTOR.
LYLE K. V. SUDROW
BY Knox & Knox

March 31, 1964  L. K. V. SUDROW  3,126,967
AUTOMATIC AUTO-ROTATING MEANS FOR AIRCRAFT SUSTAINING ROTOR
Filed Jan. 15, 1962  3 Sheets-Sheet 3

INVENTOR.
LYLE K. V. SUDROW
BY
Knox & Knox

United States Patent Office 3,126,967
Patented Mar. 31, 1964

3,126,967
AUTOMATIC AUTO-ROTATING MEANS FOR
AIRCRAFT SUSTAINING ROTOR
Lyle K. V. Sudrow, Los Angeles, Calif., assignor to
Helipod, Inc., Oceanside, Calif.
Filed Jan. 15, 1962, Ser. No. 166,026
9 Claims. (Cl. 170—160.13)

The present invention relates generally to aircraft and more particularly to automatic auto-rotating means for an aircraft sustaining rotor.

While the mechanism herein described is adaptable to various types of rotors, it is particularly suitable for the arrangement shown and described in my copending applications for Aircraft, Serial No. 124,566, filed July 17, 1961 and Ducted Sustaining Rotor for Aircraft, Serial No. 141,765, filed September 29, 1961. The rotor illustrated therein has large blades which operate in the manner of lifting wings rather than thrusting, propeller type blades, and have a fixed lifting pitch, lift being controlled by engine speed. Since the rotor is the only supporting means for the aircraft, engine failure can be disastrous unless some means is provided for emergency descent. Practicality of autogyration is well established, as illustrated in the free turning rotor driven by airflow in an autogiro and recently rotating blades have been successfully used as a substitute for a parachute. Thus by holding the rotor blades at a suitable reverse pitch angle, auto-rotation occurs and the aircraft descends at a reasonable rate, even without power. In an emergency it is essential to put the rotor into auto-rotation pitch immediately, especially at low altitudes.

The primary object of this invention therefore, is to provide a mechanism for an aircraft sustaining rotor which automatically shifts the rotor blades to auto-rotation pitch position if the driving motor is stopped or fails in flight.

Another object of this invention is to provide a mechanism which positively retains the rotor blades in correct pitch position during auto-rotation.

Another object of this invention is to provide a mechanism which will automatically engage and return the rotor blades to normal lifting pitch when driving power is applied or restored.

A further object of this invention is to provide an auto-rotation mechanism having a minimum number of parts and which is adaptable to many types of single or counter-rotating rotors with any number of blades.

Finally, it is an object to provide an auto-rotation mechanism of the aforementioned character which is simple and convenient to construct and install and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

General Rotor Structure

Figure 1:
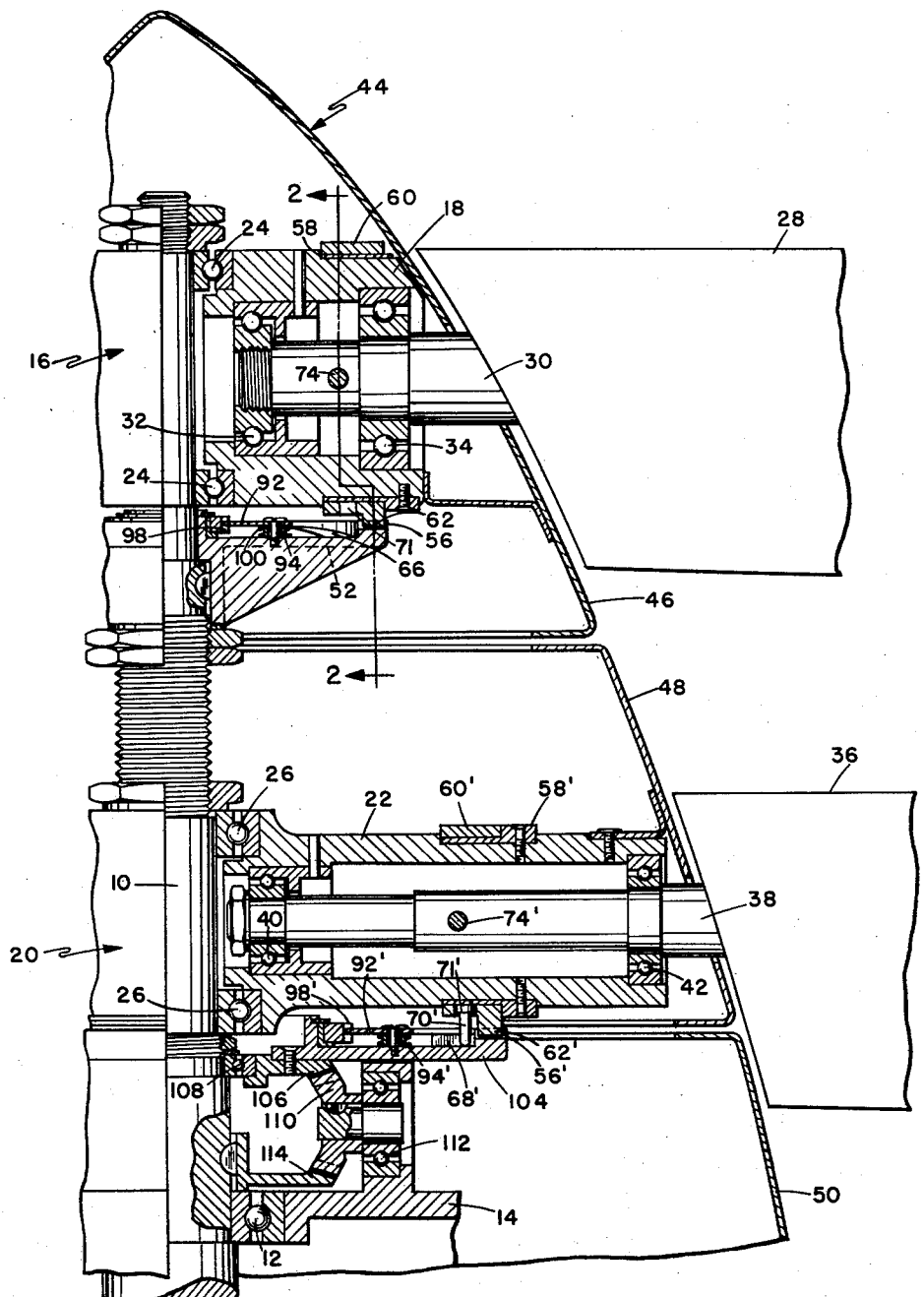
FIGURE 1 is a vertical axial sectional view of a counter-rotating rotor incorporating the mechanism.
Figure 3:
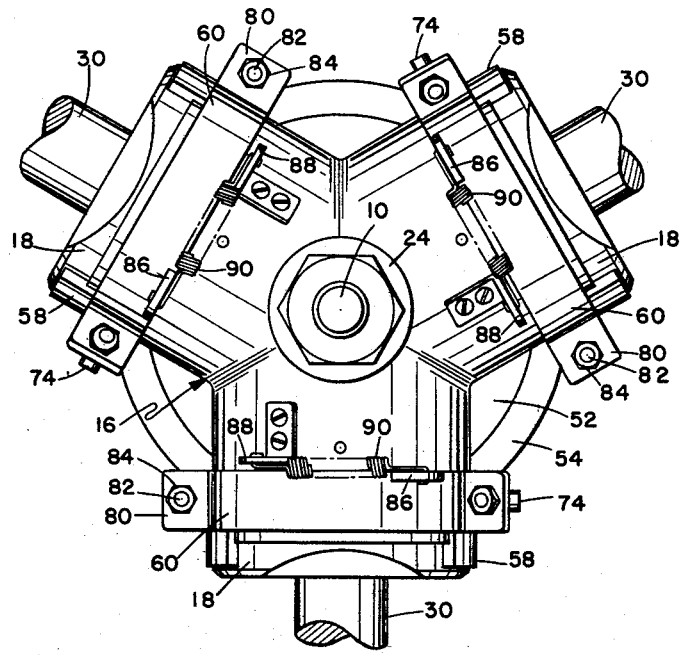
FIGURE 3 is a top plan view of the upper rotor hub assembly.

With reference primarily to FIGURES 1 and 3, the rotor has a central shaft 10 driven by any suitable means, not shown, and rotating in a support bearing 12 in a base frame 14, which is indicated fragmentarily since the particular mounting and installation is not critical. The assembly is illustrated as a counter-rotataing unit having a pair of three bladed rotors, with an upper hub 16 having radially extending, cylindrical barrel portions 18, as in FIGURE 3, and a lower hub 20 having barrel portions 22. The upper hub 16 is mounted on bearings 24 for axial rotation around shaft 10, lower hub 20 being similarly mounted on bearings 26. The hubs are thus rotatable independently of shaft 10 and are driven by engagement through the driving and auto-rotation mechanism to be described later.

The upper hub 16 carries rotor blades 28, each having a stub shaft 30 journalled in bearings 32 and 34 coaxially mounted in barrel portions 18. Lower hub 20 carries rotor blades 36 having stub shafts 38 which are held in bearings 40 and 42 in the barrel portions 22. The specific bearings and retaining means for the rotor blades, as illustrated in FIGURE 1, are merely an example and may vary to suit particular load and operating conditions. The assembly may be enclosed in a streamlined spinner 44 having an upper portion 46 fixed to hub 16, a lower portion 48 fixed to hub 20 and a fixed base fairing 50.

Driving and Auto-Rotation Mechanism

Figure 4:
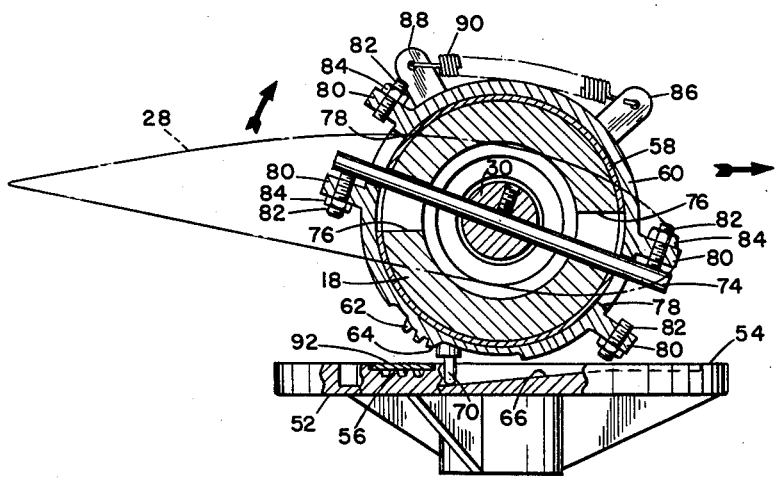
FIGURE 4 is a sectional view similar to FIGURE 2, but with the rotor in auto-rotation position.
Figure 6:
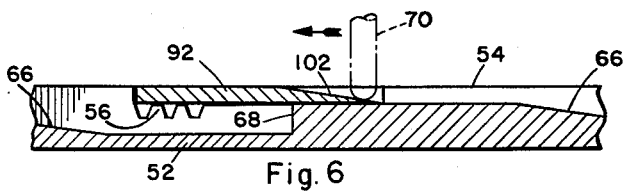
FIGURE 6 is an enlarged fragmentary sectional view taken on the line 6—6 of FIGURE 5.

Immediately below the upper hub 16 is a circular clutch plate 52 fixed to the shaft 10, said clutch plate having an annular rim 54 in the upper edge of which are three equally spaced toothed rack sections, 56. On each barrel portion 18 is a fixed bearing sleeve 58 on which is an actuating ring 60 having a toothed gear segment 62 which engages one of the rack sections 56. The actuating rings 60 are rotatable on their individual bearing sleeves 58 but are retained against axial displacement. In each gear segment 62, the leading tooth, in the direction of rotation of hub 16, has a curved leading edge 64, the purpose of which will be described later. Inwardly of the rim 54, the clutch plate 52 has three circumferentially extending, upwardly inclined ramps 66, best illustrated in FIGURES 1, 4, 6 and each terminating in a vertical stop face 68 adjacent a rack section. In each barrel portion is a vertical drive pin 70 extending downwardly, through a clearance slot 71 in actuating ring 60, to engage one stop face 68, the drive pins being downwardly biased but vertically slidable in a suitable spring mounting 72, such devices being well known.

Fixed diametrically through each stub shaft 30 is a pitch shifting pin 74 which extends radially outwardly through opposed limiting slots 76 in the barrel portion 18 and through clearance slots 78 in actuating ring 60. The slots 78 are circumferentially elongated and at each end thereof are lugs 80 projecting radially from the actuating ring 60, as in FIGURES 2 and 3. In each lug 80 is an adjustment screw 82 engageable with the pin 74 to provide for fine adjustment of the limits of travel of the actuating ring and pin, each screw being held by a lock nut 84.

On each actuating ring 60 is a bracket 86 and on the barrel portion 18 adjacent thereto is a second bracket 88. Secured between each pair of brackets 86 and 88 is a tension type return spring 90 which biases the actuating ring in such a manner that the gear segment 62 is urged in the direction of motion of cluch plate 52 and into engagement with rack section 56, as in FIGURE 2. In this position the pin 74 is held against one end of the limiting slots 76 with the rotor blade 28, indicated in broken line, in normal lift pitch position at a positive angle of attack. The circumferential length of the limiting slots 76 controls the maximum pitch change of the rotor blades and can be varied to suit a specific rotor.

Figure 5:
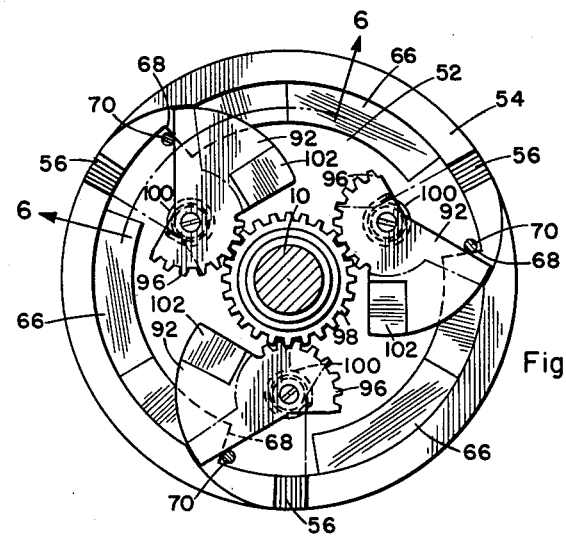
FIGURE 5 is a sectional view taken on the line 5—5 of FIGURE 2.

Secured to the clutch plate 52 are three cover plates 92 which are pivotally mounted on bosses 94 to swing outwardly and cover the rack sections 56, as indicated in broken line in FIGURE 5. The rim 54 is cut away to clear the cover plates 92 which, in their closed position covering the rack sections, form smooth continuations of the upper surface of said rim. Each cover plate 92 has an inner gear portion 96 which engages a common synchronizing gear 98 freely rotatably mounted coaxially with the drive plate 52, so that all cover plates move together. The cover plates 92 are biased to their closed position by torsion springs 100 around bosses 94 and are held open in the drive position, shown in full line in FIGURE 5, by the drive pins 70. The trailing edge of each cover plate 92 has an inclined face 102 which forms a continuation of the adjacent ramp 66 when the cover plate is closed.

Immediately below the lower hub 20 is a clutch plate 104 fixed to a driven bevel gear 106, which is freely rotatable about shaft 10 on a bearing 108. The driving and pitch change mechanism for the lower rotor is otherwise similar in all respects to that described above and the appropriate parts in FIGURE 1 are identified by similar numerals followed by a prime. It should be understood, however, that the upper hub 16 turns in the opposite direction from the lower hub 20, thus the corresponding mechanisms will be arranged for opposite operation.

The driven bevel gear 106 is engaged by a suitable number of transfer bevel gears 110 supported in bearings 112 in the frame 14 and rotating on axes radially of shaft 10. The transfer gears 110, in turn, are engaged by a bevel drive gear 114 fixed to shaft 10 in a conventional counter-rotating gear arrangement.

*Operation*

Figure 2:
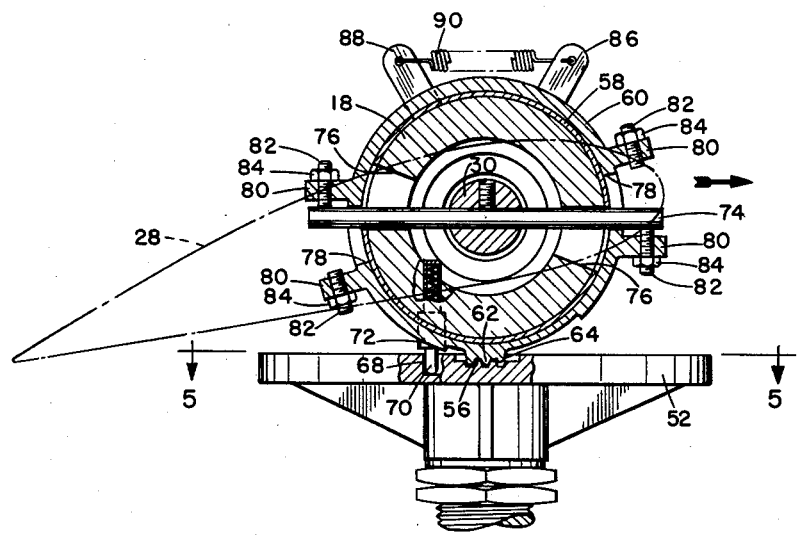
FIGURE 2 is a sectional view taken on the line 2—2 of FIGURE 1.

In normal driving operation, rotation of shaft 10 rotates both clutch plates 52 and 104, in opposite directions, the stop faces 68 being held firmly against drive pins 70 and turning the rotors, as in FIGURE 2. Aerodynamic drag on the rotor blades will maintain the contact between stop faces and drive pins and prevent over speeding of the rotors as long as the clutch plates are being driven.

If power shrould fail, the shaft 10 and both clutch plates will stop turning. The rotors will continue to turn due to inertia, the action causing the gear segments 62 of acuating rings 60 to roll and lift clear of the rack sections 56, as in FIGURE 4. The clearance slots 78 in each actuating ring 60 allow sufficient rotation to disengage the gear segment before the pitch shifting pin 74 is engaged by the screws 82 and carried to the other ends of limiting slots 76, so shifting the rotor blade to auto-rotation pitch as indicated in broken line in FIGURE 3. Aerodynamic pressure under the rotor blade will tend to assist this action with driving power lost.

As the drive pins 70 move away from stop faces 68, the cover plates 92 are closed by their springs 100 and cover the rack sections 56,. as indicated in broken line positions in FIGURE 5. With the rotors auto-rotating, the drive pins 70 ride up each ramp 66, over the inclined faces 102 and across cover plates 92, as in FIGURE 6, and drop down to the beginning of the next ramp. The action is somewhat similar to that of a ratchet.

The springs 90 tend to return the actuating rings 60 to normal position, but the curved leading edges 64 of gear segments 62 ride on the smooth upper surface formed by the cover plates 92 in rim 54. The cover plates thus act as lock-out means and ensure that the rotor blades remain in auto-rotation pitch as long as power is not available.

If power is restored, the clutch plates 52 and 104 begin to rotate and "catch up" with the rotors, so that the stop faces 68 meet and engage the drive pins 70 and apply power to the rotors. The cover plates 92 are forced back to their open positions by stop pins 70, uncovering the rack sections 56. Springs 90 now return the actuating rings to normal position and the gear segments 62 drop back into engagement with the rack sections 56. At the same time, the actuating rings 60 carry the pins 74 back and return the rotor blades to lifting pitch position, as in FIGURE 2.

The operation is completely automatic and repetitive, without the need for manual control or resetting. Actual moving parts are reduced to a minimum and the assembly is very compact.

It is understod that minor variation from the form of the invention disclosed herein may be made without departure from the spirit and scope of the invention, and that the specification and drawing are to be considered as merely illustrative rather than limiting.

I claim:

1. Automatic auto-rotation means for an aircraft sustaining rotor, comprising:
    a driven shaft;
    a hub freely rotatably mounted on said shaft;
    said hub having a plurality of rotor blades mounted thereon, and said blades being adjustable in pitch about axes extending substantially radially of said hub;
    clutch means connected to and rotatable with said shaft;
    drive means on said hub engageable with said clutch means in one direction of rotation;
    and pitch shifting means on said clutch means and engaging said rotor blades to shift said blades to auto-rotation pitch when said clutch means is retarded.

2. Automatic auto-rotation means for an aircraft sustaining rotor comprising:
    a driven shaft;
    a hub freely rotatably mounted on said shaft;
    said hub having a plurality of rotor blades mounted thereon, and said blades being adjustable in pitch about axes extending substantially radially of said hub;
    clutch means connected to and rotatable with said shaft;
    drive means on said hub engageable with said clutch means in one direction of rotation;
    pitch shifting means on said clutch means and engaging said rotor blades to shift said blades to auto-rotation pitch when said clutch means is retarded;
    and return means coupled to said rotor blades to return the blades to normal pitch position when said clutch means is driven to coincide with rotation of said hub.

3. Automatic auto-rotation means for an aircraft sustaining rotor, comprising:
    a driven shaft;
    a hub freely rotatably mounted on said shaft;
    said hub having a plurality of rotor blades mounted thereon, and said blades being adjustable in pitch about axes extending substantially radially of said hub;
    clutch means connected to and rotatable with said shaft;
    drive means on said hub engageable with said clutch means in one direction of rotation;
    pitch shifting means on said clutch means and engaging said rotor blades to shift said blades to auto-rotation pitch when said clutch means is retarded;
    said clutch means having lock-out means operable by disengagement of said drive means therefrom to retain said rotor blades in auto-rotation pitch;
    and return means coupled to said rotor blades to return the blades to normal pitch position when said clutch means is driven to coincide with rotation of said hub.

4. Automatic auto-rotation means according to claim 3, wherein said hub has positive stop means to limit the pitch change travel of said rotor blades.

5. Automatic auto-rotation means for an aircraft sustaining rotor, comprising:
a driven shaft;
a hub freely rotatably mounted on said shaft;
said hub having a plurality of radially extending barrel portions;
rotor blades having stub shafts pivotally mounted in said barrel portions on axes substantially radially of said hub;
stop means in said barrel portions to hold said blades in a normal lifting pitch position;
clutch means connected to and rotatable with said shaft;
drive means on said hub engageable with said clutch means in one direction of rotation;
pitch shifting means on said clutch means and engaging said rotor blades to shift said blades to auto-rotation pitch when said clutch means is retarded;
and return means coupled to said blades to return the blades to normal pitch position when said clutch means is driven to coincide with rotation of said hub.

6. Automatic auto-rotation means for an aircraft sustaining rotor, comprising:
a driven shaft;
a hub freely rotatably mounted on said shaft;
said hub having a plurality of radially extending barrel portions;
rotor blades having stub shafts pivotally mounted in said barrel portions on axes substantially radially of said hub;
stop means in said barrel portions to hold said blades in a normal lifting pitch position;
a generally circular clutch plate connected to and rotatable with said shaft;
drive means on said hub engageable with said clutch plate in one direction of rotation;
said clutch plate having an annular rim with toothed rack sections spaced to correspond with said barrel portions;
each of said barrel portions having an actuating ring axially rotatably mounted thereon, and each actuating ring having a toothed gear segment engageable with one of said rack sections;
said actuating rings being coupled to said rotor blades, whereby continued rotation of said hub while said clutch plate is retarded causes turning of said gear segments in said rack portions, so that said rotor blades are shifted to an auto-rotation pitch position.

7. Automatic auto-rotation means according to claim 6 and including lock-out means to retain said rotor blades in auto-rotation pitch position, said lock-out means comprising:
cover plates pivotally mounted on said clutch plate;
means to swing said cover plates to cover said rack sections and prevent re-engagement of said gear segments therewith after said rotor blades are shifted to autorotation pitch position;
and means to return said cover plates and expose said rack sections when said clutch plate is driven to coincide with rotation of said hub.

8. Automatic auto-rotation means for an aircraft sustaining rotor, comprising:
a driven shaft;
a hub freely rotatably mounted on said shaft;
said hub having a plurality of radially extending barrel portions;
rotor blades having stub shafts pivotally mounted in said barrel portions on axes substantially radially of said hub;
stop means in said barrel portions to hold said blades in a normal lifting pitch position;
a generally circular clutch plate connected to and rotatable with said shaft;
said clutch plate having stop portions peripherally spaced to correspond with said barrel portions;
said barrel portions having drive pins engageable with said stop portions in one direction of relative rotation of said clutch plate;
said clutch plate having peripheral ramps extending from adjacent the base of each stop portion to the top of the next stop portion;
said drive pins being telescopic, whereby the pins ride up said ramps and allow said hub to turn freely in the non-engaging direction of relative rotation of the clutch plate;
said clutch plate having an annular rim with toothed rack sections spaced to correspond with said barrel portions;
each of said barrel portions having an actuating ring axially rotatably mounted thereon, and each actuating ring having a toothed gear segment engageable with one of said rack sections;
said actuating rings being coupled to said rotor blades, whereby continued rotation of said hub while said clutch plate is retarded causes turning of said gear segments in said rack portions, so that said rotor blades are shifted to an auto-rotation pitch position.

9. Automatic auto-rotation means according to claim 8 and including lock-out means to retain said rotor blades in auto-rotation pitch position, said lock-out means comprising:
cover plates pivotally mounted on said clutch plate;
said cover plates being biased to swing and cover said rack sections and prevent re-engagement of said gear segments therewith after said rotor blades are shifted to auto-rotation pitch position;
said cover plates having ramp portions forming extensions of said ramps when in auto-rotation position;
said cover plates being engaged by said drive pins and returned to positions clear of said rack sections when said clutch plate is driven to coincide with rotation of said hub.

References Cited in the file of this patent
UNITED STATES PATENTS

| | | |
|---|---|---|
| 1,507,513 | Perrin | Sept. 2, 1924 |
| 1,970,114 | Wiegand | Aug. 14, 1934 |
| 2,177,315 | Caria | Oct. 24, 1939 |
| 2,421,692 | Hackethal | June 3, 1947 |
| 2,643,726 | Muther | June 30, 1953 |